United States Patent
Gurvich et al.

(10) Patent No.: US 11,713,784 B1
(45) Date of Patent: Aug. 1, 2023

(54) LEAK RESISTANT COMPLIANT BUSHING

(71) Applicant: Hamilton Sundstrand Corporation, Charlotte, NC (US)

(72) Inventors: Mark R. Gurvich, Middletown, CT (US); August M. Coretto, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/579,724

(22) Filed: Jan. 20, 2022

(51) Int. Cl.
*F16C 17/02* (2006.01)
*F16C 27/02* (2006.01)

(52) U.S. Cl.
CPC .............. *F16C 27/02* (2013.01); *F16C 17/02* (2013.01)

(58) Field of Classification Search
CPC ........ F16C 17/02; F16C 27/02; F16C 29/002; F16C 31/02; Y10T 403/7047; Y10T 403/7058; Y10T 16/05
USPC .................................................. 16/2.1–2.5
See application file for complete search history.

(56) References Cited

U.S. PATENT DOCUMENTS

| | | | |
|---|---|---|---|
| 2,366,653 A * | 1/1945 | Risk | D01H 7/16 242/571.4 |
| 3,501,182 A | 3/1970 | Buchsbaum | |
| 4,605,363 A | 8/1986 | Walsh | |
| 5,383,811 A * | 1/1995 | Campbell | F16C 33/201 384/42 |
| 5,477,673 A * | 12/1995 | Blais | F04D 27/0215 60/785 |
| 6,122,905 A * | 9/2000 | Liu | F04D 27/023 60/785 |
| 7,665,747 B2 | 2/2010 | Arlt | |
| 9,989,084 B2 | 6/2018 | Nakagawa et al. | |
| 9,995,337 B2 | 6/2018 | Ikeda et al. | |
| 11,118,623 B2 | 9/2021 | Son | |
| 11,293,493 B2 * | 4/2022 | Lundsted Poulsen | F16C 17/22 |
| 2002/0085778 A1 | 7/2002 | Mena | |
| 2008/0088104 A1 * | 4/2008 | Arlt | F16C 33/20 280/93.514 |
| 2018/0017100 A1 * | 1/2018 | Nakagawa | F16C 29/002 |
| 2019/0368548 A1 * | 12/2019 | Lundsted Poulsen | F04D 29/046 |
| 2021/0140471 A1 * | 5/2021 | Son | F16C 27/02 |

FOREIGN PATENT DOCUMENTS

GB 2269211 A 2/1994

OTHER PUBLICATIONS

European Application No. 23152538.7 filed Jan. 19, 2023; European Search Report dated May 17, 2023; 9 pages.

* cited by examiner

*Primary Examiner* — Alan B Waits
(74) *Attorney, Agent, or Firm* — Cantor Colburn LLP

(57) ABSTRACT

A leak resistant compliant bushing includes a body having a first end, a second end, an outer surface and an inner surface defining a passage. The outer surface and the inner surface extending between the first end and the second end and define an axial axis. A first plurality of channels extends into the body from the first end. Each of the first plurality of channels includes a terminal end that is spaced from the second end. A second plurality of channels extend into the body from the second end. Each of the second plurality of channels extend between adjacent ones of the first plurality of channels and include a terminal end section that is spaced from the first end.

16 Claims, 7 Drawing Sheets

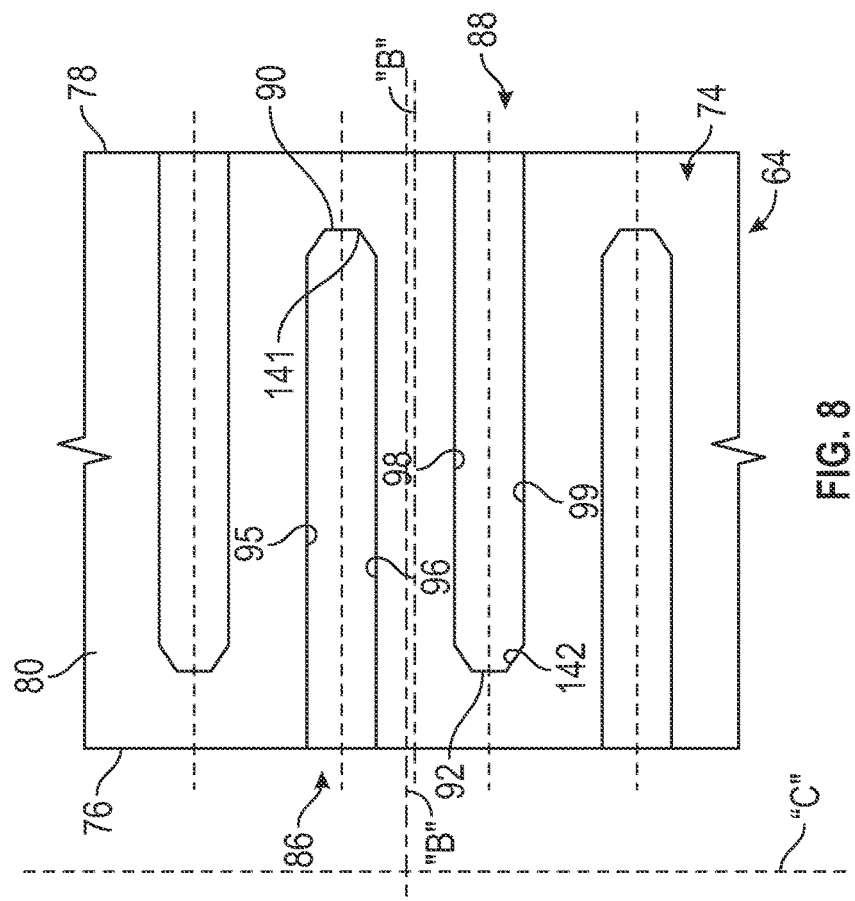
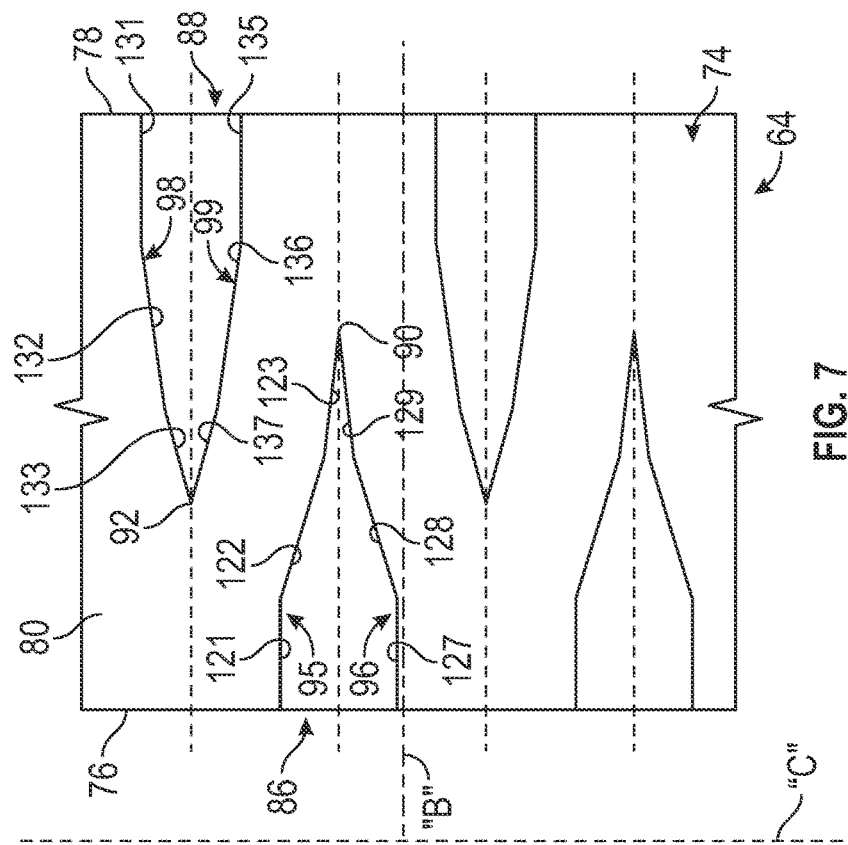

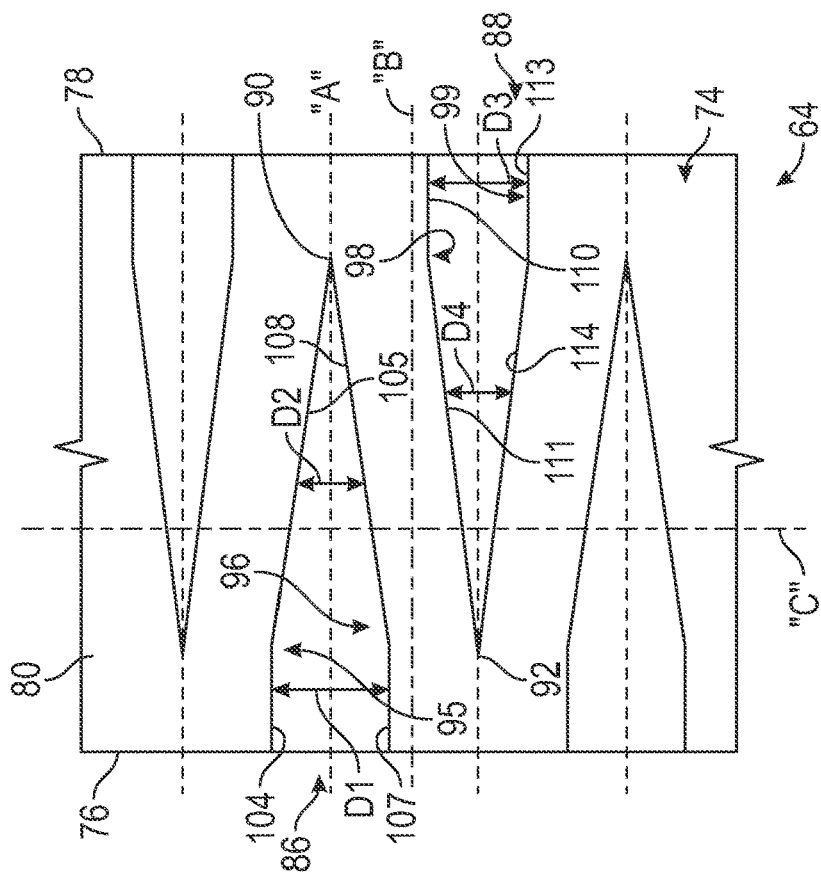
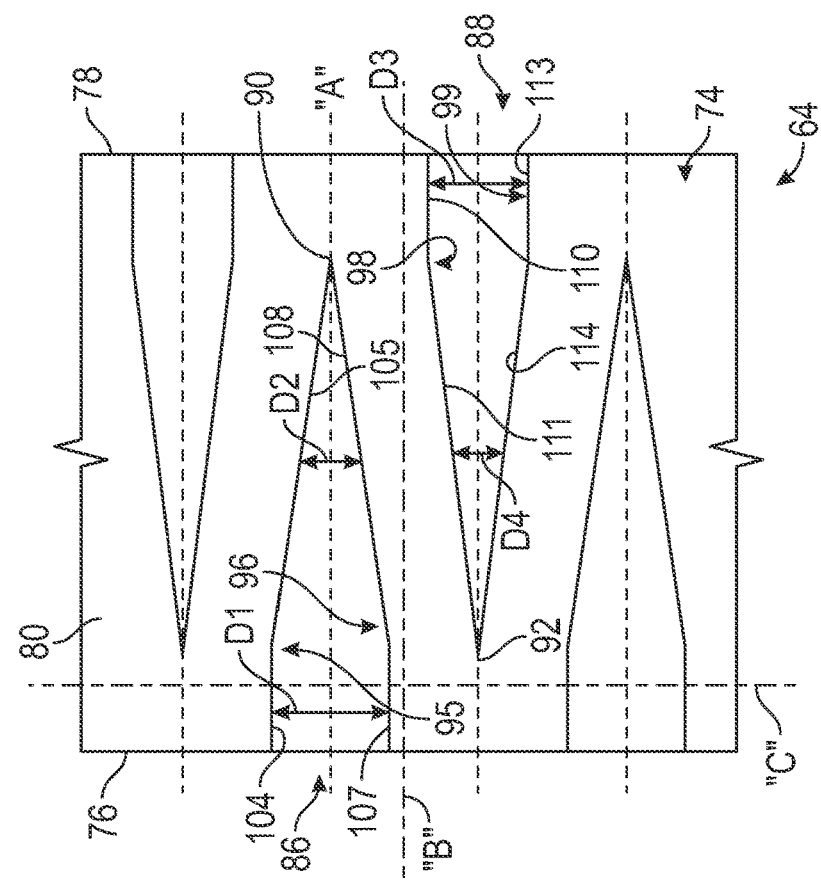

LEAK RESISTANT COMPLIANT BUSHING

BACKGROUND

Exemplary embodiments pertain to the art of bushings and, more particularly, to a compliant bushing that resists leakage.

Bushings are often used as bearings to support a shaft that may rotate and/or slide relative to, for example, a fixed support. Typically, the bushing is fixedly secured to the fixed support. A clearance exists between the bushing and the shaft. The clearance allows for installation of the shaft, installation of the busing, as well as accommodates dimensional changes in the bushing due to operational temperatures and/or wear. Tight clearance is needed to mitigate risks of potential leaking between opposite ends of bushings. On the other hand, a clearance that is too tight makes installation difficult.

To reduce installation challenges, in some cases, the bushing may include a split through the entire length of the bushing. The split allows for a measure of compliance during installation along with maintenance of desired clearances. However, the split may introduce an unwanted leakage path beyond that provided by the closely controlled clearances. In other words, any installation improvements are offset by a higher risk of leaking.

BRIEF DESCRIPTION

Disclosed in accordance with a non-limiting example, is a leak resistant compliant bushing including a body having a first end, a second end, an outer surface and an inner surface defining a passage. The outer surface and the inner surface extending between the first end and the second end and define an axial axis. A first plurality of channels extends into the body from the first end. Each of the first plurality of channels includes a terminal end that is spaced from the second end. A second plurality of channels extend into the body from the second end. Each of the second plurality of channels extend between adjacent ones of the first plurality of channels and include a terminal end section that is spaced from the first end.

Additionally, or alternatively, in this or other non-limiting examples, each of the first plurality of channels includes a first side portion and a second side portion that join at the terminal end portion; and each of the second plurality of channels includes a first side section and a second side section that join at the terminal end section.

Additionally, or alternatively, in this or other non-limiting examples, the terminal end portion includes a curvilinear portion.

Additionally, or alternatively, in this or other non-limiting examples, each of the first plurality of channels and the second plurality of channels extends across the body at a non-zero angle relative to the axial axis.

Additionally, or alternatively, in this or other non-limiting examples, the first side portion extends at a first angle relative to the axial axis of the bushing and the second side portion extends at a second angle relative to the axial axis.

Additionally, or alternatively, in this or other non-limiting examples, the first angle and the second angle are substantially 0°.

Additionally, or alternatively, in this or other non-limiting examples, the first side portion includes a first segment a second segment, and the second side portion includes a third segment and a fourth segment, wherein the first segment and the third segment extend at the first angle relative to the axial axis.

Additionally, or alternatively, in this or other non-limiting examples, the second segment and the fourth segment extend at a non-zero angle relative to the axial axis.

Additionally, or alternatively, in this or other non-limiting examples, the first side section includes a first segment section and a second segment section, and the second side section includes a third segment section and a fourth segment section.

Additionally, or alternatively, in this or other non-limiting examples, the first segment is spaced from the second segment at a first width, and the third segment is spaced from the fourth segment at a second width, and the first segment section is spaced from the second segment section at a third width and the third segment section is spaced from the fourth segment section at a fourth width.

Additionally, or alternatively, in this or other non-limiting examples, the second width is non-uniform along the axial axis.

Additionally, or alternatively, in this or other non-limiting examples, the first width, the second width of each of the first plurality of channels and each of the third width and the fourth width of each of the second plurality of channels are substantially constant along a hoop direction of the bushing.

Additionally, or alternatively, in this or other non-limiting examples, the second width of each of the first plurality of channels and the fourth width of each of the second plurality of channels are non-uniform along the hoop direction.

Also disclosed in accordance with a non-limiting example, is an aircraft including a fuselage, at least one engine supported by the fuselage, and a mechanical system arranged in the fuselage. The mechanical system includes a shaft supported by a leak resistant compliant bushing including a body having a first end, a second end, an outer surface and an inner surface defining a passage. The outer surface and the inner surface extend between the first end and the second end and define an axial axis. A first plurality of channels extend into the body from the first end. Each of the first plurality of channels includes a terminal end that is spaced from the second end. A second plurality of channels extend into the body from the second end. Each of the second plurality of channels extend between adjacent ones of the first plurality of channels and include a terminal end section that is spaced from the first end.

Additionally, or alternatively, in this or other non-limiting examples, each of the first plurality of channels includes a first side portion and a second side portion that join at the terminal end portion; and each of the second plurality of channels includes a first side section and a second side section that join at the terminal end section.

Additionally, or alternatively, in this or other non-limiting examples, each of the first plurality of channels and the second plurality of channels extends across the body at a non-zero angle relative to the axial axis.

Additionally, or alternatively, in this or other non-limiting examples, the first side portion extends a first angle relative to the axial axis of the bushing and the second side portion extends at a second angle relative to the axial axis.

Additionally, or alternatively, in this or other non-limiting examples, the first angle and the second angle are substantially 0°.

Additionally, or alternatively, in this or other non-limiting examples, the first side portion includes a first segment and a second segment, and the second side portion includes a third segment and a fourth segment, wherein the first segment and the third segment extend at the first angle relative to the axial axis.

Additionally, or alternatively, in this or other non-limiting examples, the first side section includes a first segment section and a second segment section, and the second side section includes a third segment section and a fourth segment section, the first segment is spaced from the second segment a first width, and the third segment is spaced from the fourth segment a second width, and the first segment section is spaced from the second segment section a third width and the third segment section is spaced from the fourth segment section a fourth width. The second width is non-uniform along the axial axis, the first width and the third width are substantially constant along a hoop direction of the bushing, and the second width and the fourth width are non-uniform along the hoop direction.

BRIEF DESCRIPTION OF THE DRAWINGS

The following descriptions should not be considered limiting in any way. With reference to the accompanying drawings, like elements are numbered alike:

FIG. 7 is a schematic plan view of outer surface of the leak resistant compliant bushing showing details of the first and second pluralities of channels, in accordance with still another non-limiting example;

FIG. 8 is a schematic plan view of outer surface of the leak resistant compliant bushing showing details of the first and second pluralities of channels, in accordance with yet another non-limiting example;

FIG. 11 is a view of the leak resistant compliant busing of FIG. 5 showing dimensional relationships between portions of the first and second pluralities of channels;

FIG. 12 is a view of the leak resistant compliant bushing of FIG. 5 showing dimensional relationships between other portions of the first and second pluralities of channels;

DETAILED DESCRIPTION

A detailed description of one or more embodiments of the disclosed apparatus and method are presented herein by way of exemplification and not limitation with reference to the Figures.

Figure 1:
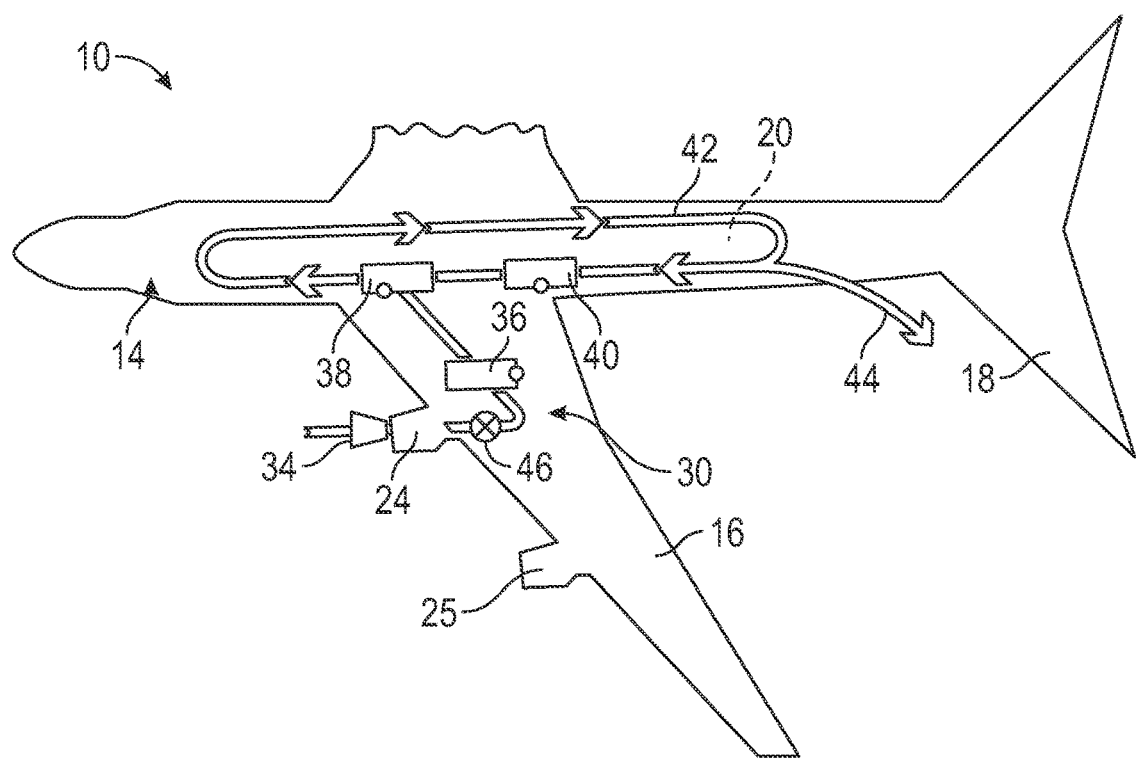
FIG. 1 depicts a partial glass view of an aircraft including a mechanical system having a leak resistant compliant bushing, in accordance with a non-limiting example.

An aircraft in accordance with a non-limiting example is indicated generally at 10 in FIG. 1. Aircraft 10 includes a fuselage 14 supporting a pair of wings, one of which is shown at 16, and a tail 18. Fuselage 14 defines, in part, a cabin 20 that accommodates crew and/or passengers. Wing 16 supports a first engine 24 and a second engine 25. Fuselage 14 includes a cabin air system 30 that is connected to first engine 24. Cabin air system 30 may also be connected to second engine 25.

In a non-limiting example, cabin air system 30 includes an air intake 34 at first engine 24, an air conditioner 36, and an air mixing unit 38. An air filter 40 filters air passing into an air circulation circuit 42. An exhaust 44 discharges air from air circulation circuit 42 adjacent to tail 18. A mechanical system, shown in the form of a bleed air valve 46 provides an interface between first engine 24 and air conditioner 36.

Figure 2:
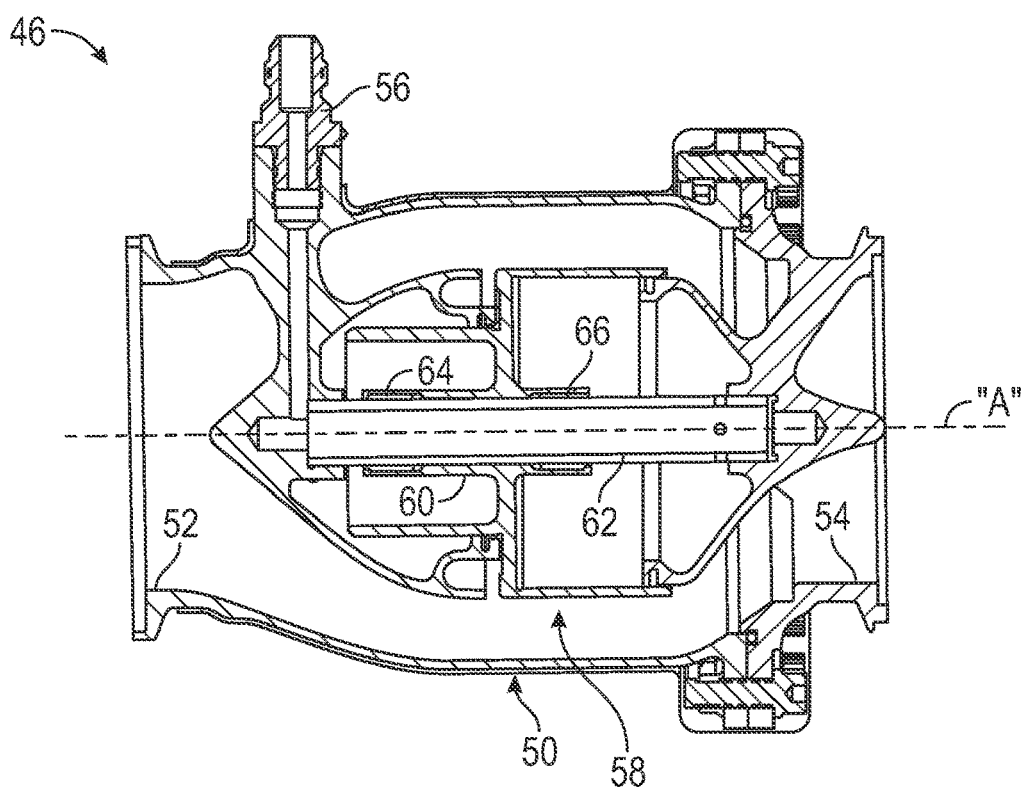
FIG. 2 is an axial cross-sectional schematic view of the mechanical system of FIG. 1 including the leak resistant compliant bushing, in accordance with a non-limiting example.

In a non-limiting example shown in FIG. 2, bleed air valve 46 includes a housing 50 including an inlet 52 and an outlet 54. A controlling air inlet 56 projects outwardly from 50 between inlet 52 and outlet 54. A valve member 58 is disposed in housing 50. Valve member 58 selectively connected inlet 52 and outlet 54. Valve member 58 includes a hub 60 supported on a shaft 62 having a shaft axis "A". A first leak resistant compliant bushing 64 and a second leak resistant compliant bushing 66 provide a wear resistant interface between hub 60 and shaft 62. Openings 68 on shaft 62 are provided to fluidly connect controlling air with the interior of valve member 58 which provides an axial driving force. In a non-limiting example, valve member 58 transitions on shaft 62 along the shaft axis "A" when controlled by the pressure from 56 (passing through holes 68) to fluidically connect air passing from first engine 24 through air inlet 52 to valve outlet 54.

Figure 3:
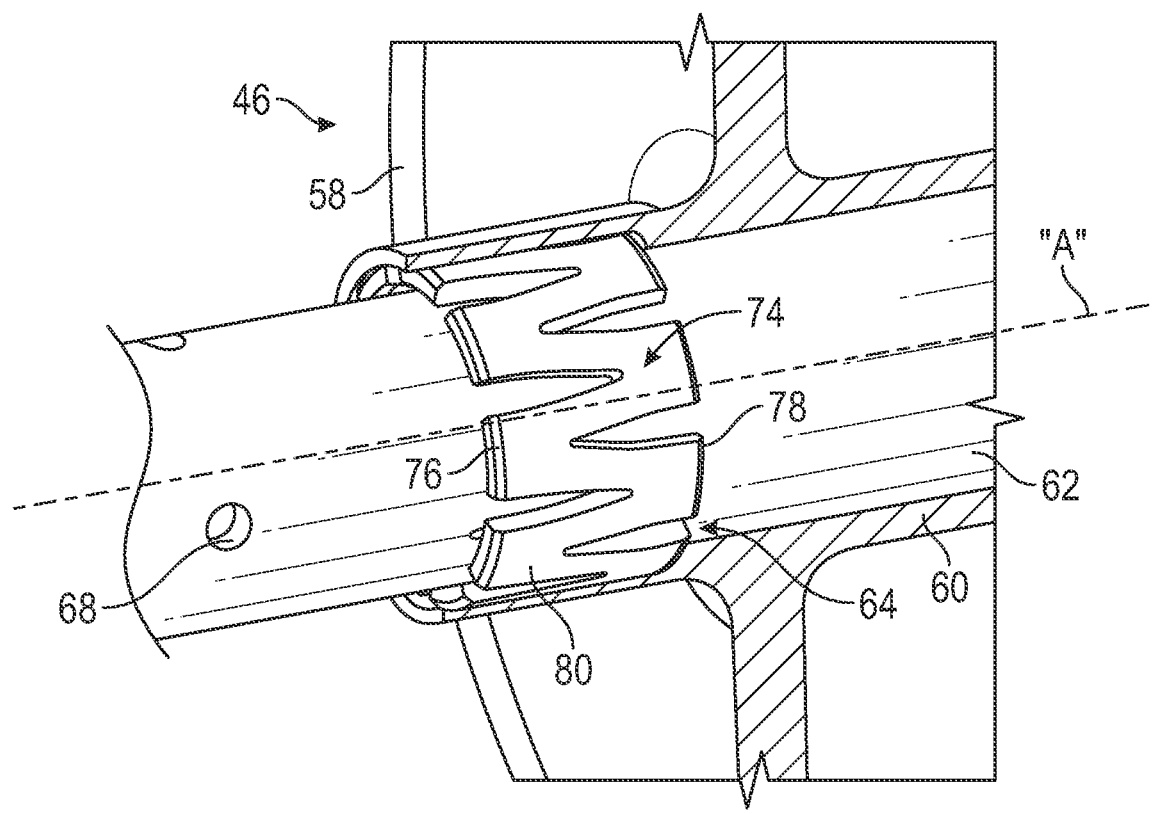
FIG. 3 is a perspective view depicting a shaft of the mechanical system being supported by the leak resistant compliant bushing including first and second pluralities of channels, in accordance with a non-limiting example.
Figure 4:
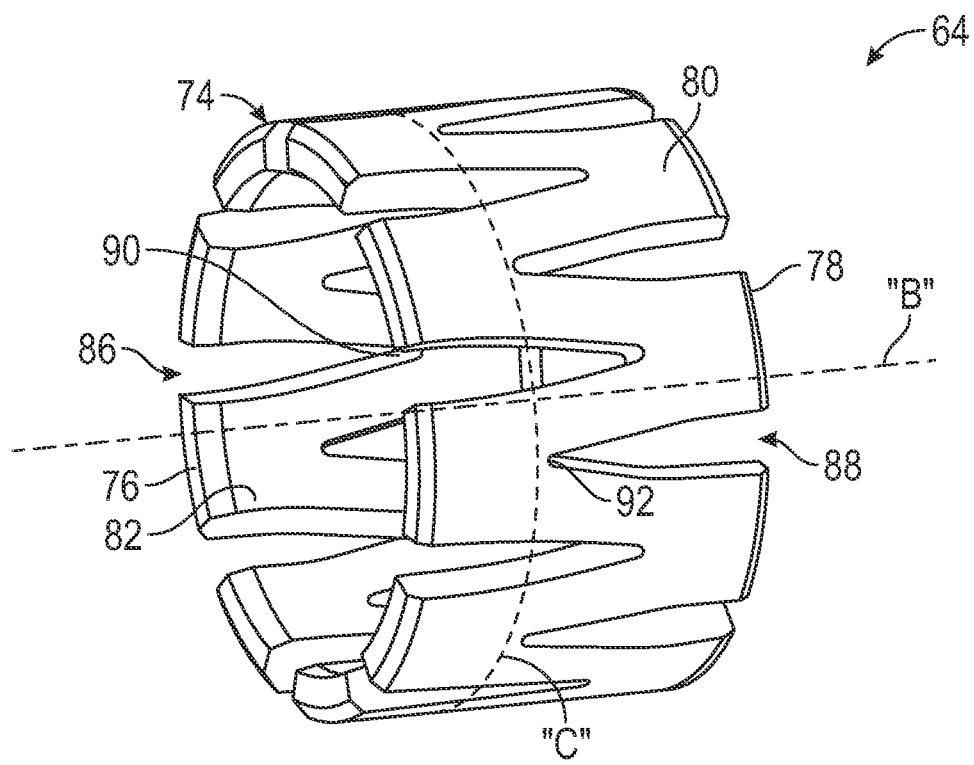
FIG. 4 is a perspective view of the leak resistant compliant bushing, in accordance with a non-limiting example.

Reference will now follow to FIGS. 3 and 4 in describing leak resistant compliant bushing 64 with an understanding that leak resistant compliant bushing 66, shown in FIG. 2, may include similar structure. Leak resistant compliant bushing 64 includes a body 74 having a first end 76 and a second end 78. In a non-limiting example, body 74 is formed from a metal or metal alloy. In additional embodiments, body 74 may also be formed from polymeric, fiber-reinforced polymer-matrix composites or hybrid (e.g., metallic/polymeric or metallic/composite) materials. An outer surface 80 extends between first end 76 and second end 78. Likewise, an inner surface 82 extends between first end 76 and second end 78. An axial axis "B" extends between first end 76 and second end 78. A hoop axis "C" defining a hoop direction circumscribes outer surface 80.

In a non-limiting example, a first plurality of channels 86 extends from first end 76 towards second end 78. A second plurality of through-thickness channels 88 extends from second end 78 towards first end 76. In a non-limiting example, each of the first plurality of channels 86 terminates short of second end 78 at a terminal end 90. Each of the second plurality of channels 88 terminates short of first end 76 at a terminal end section 92. In further accordance with a non-limiting example, each of the first plurality of channels 86 and second plurality of channels 88 extend entirely through body 74 (e.g., from outer surface 80 through inner surface 82).

Figure 5:
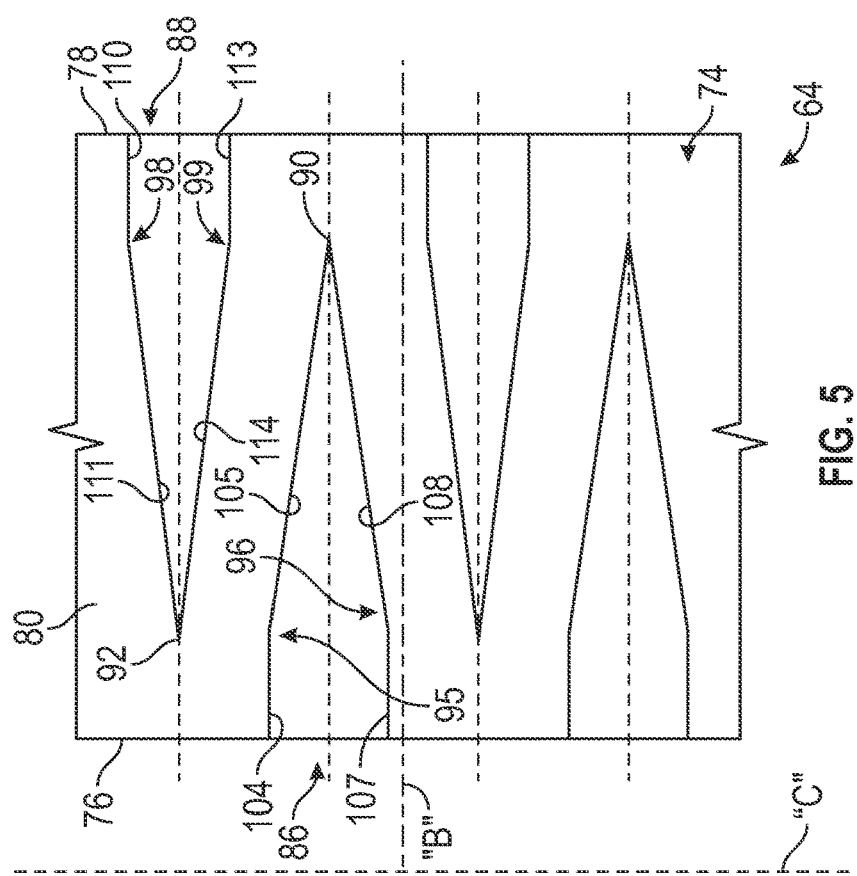
FIG. 5 is a schematic plan view of outer surface of the leak resistant compliant bushing of FIG. 4 showing details of the first and second pluralities of channels, in accordance with a non-limiting example.

Reference will now follow to FIG. 5 in describing first and second pluralities of channels 86 and 88 in accordance with a non-limiting example. Each of the first plurality of channels 86 includes a first side portion 95 and a second side portion 96 that extend from first end 76 and converge at terminal end 90. Each of the second plurality of channels 88 includes a first side section 98 and a second side section 99 that extend from second end 78 and converge at terminal end portion 92.

In a non-limiting example, first side portion 95 includes a first segment 105 that extends substantially parallel to axial axis "B" and a second segment 106 that extends at an angle relative to axial axis "B". Similarly, second side portion 96 includes a third segment 107 that extends substantially parallel to axial axis "B" and a fourth segment 108 that extends at an angle relative to axial axis "B". First side section 98 includes a first segment section 110 that extends substantially parallel to axial axis "B" and a second segment section 111 that extends at an angle relative to axial axis "B". Similarly, second side section 99 includes a first segment section 113 that extends substantially parallel to axial axis "B" and a fourth segment section 114 that extends at an angle relative to axial axis "B". First and second pluralities of channels 86 and 88 allow body 74 to have a circumferential stiffness that is lower than a corresponding solid bushing of the same material, such that the bushing is easier to install reducing tooling required and cost. Further, unlike split bushings, channels 86 and 88 do not extend fully from end 76 to 78 thus leakage is equivalent to a solid bushing, and less than a split bushing.

Figure 6:
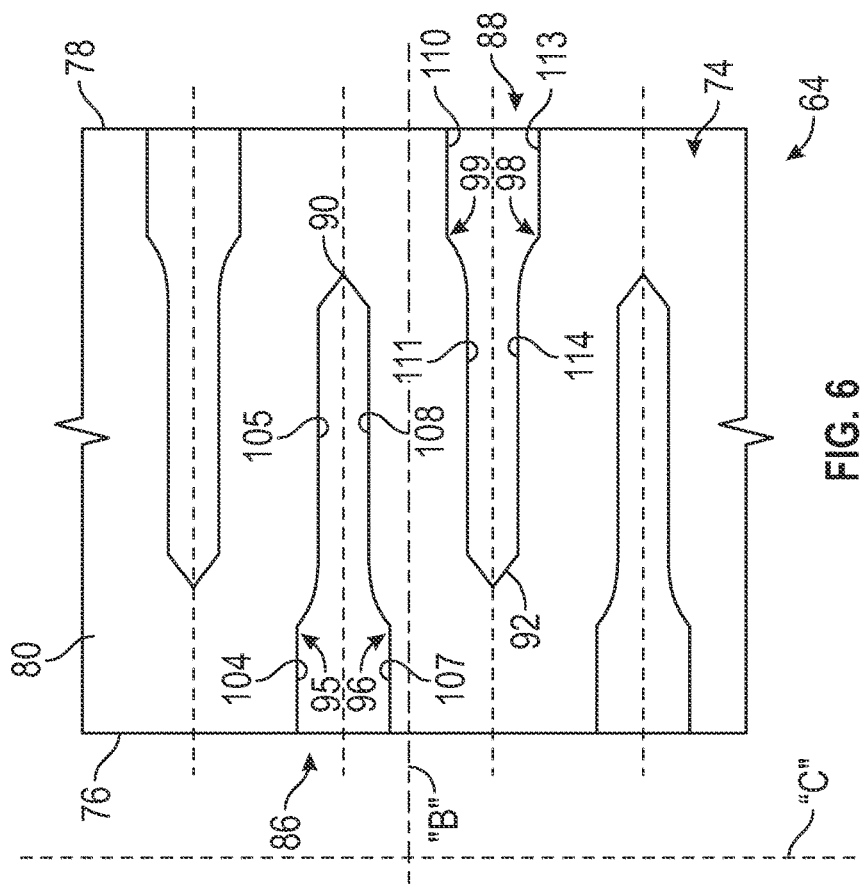
FIG. 6 is a schematic plan view of outer surface of the leak resistant compliant bushing showing details of the first and second pluralities of channels, in accordance with another non-limiting example.

Reference will follow to FIG. 6, wherein like reference numbers represent corresponding parts in the respective views, in describing leak resistant compliant bushing 64 in accordance with another non-limiting example. As shown in FIG. 6, first segment 105 and second segment 106 extend into body 74 along axes that are substantially parallel to axial axis "B". Likewise, third segment 107 and fourth segment 108 extend into body 74 along axes that are substantially parallel to axis "B".

Second segment 105 and fourth segment 108 join at terminal end 90 having a substantially curvilinear profile. First segment section 110 and second segment section 111 extend into body 74 along axes that are substantially parallel to axial axis "B". Likewise, first segment section 113 and fourth segment section 114 extend into body 74 along axes that are substantially parallel to axial axis "B". Second segment section 111 and fourth segment section 114 join at terminal end 92 having a substantially curvilinear profile.

Reference will follow to FIG. 7, wherein like reference numbers represent corresponding parts in the respective views, in describing leak resistant compliant bushing 64 in accordance with yet another non-limiting example. First side portion 95 includes a first segment 121, a second segment 122, and a third segment 123. First segment 121 extends substantially parallel to axial axis "B" while second segment 122 and third segment 123 extend at different angles relative to axial axis "B". Second side portion 96 includes a fourth segment 127, a fifth segment 128, and a sixth segment 129. Fourth segment 127 extends substantially parallel to axial axis "B" while fifth segment 128 and sixth segment 129 extend at different angles relative to axial axis "B". In a non-limiting example, portions of the first plurality of channels 86 and/or portions of the second plurality of channels 88 can be defined with varied non-zero angles with respect to axial axis "A", creating for example, non-linear convex or concave profiles.

First side section 98 includes a first segment section 131, a second segment section 132, and a third segment section 133. First segment section 131 extends substantially parallel to axial axis "B" while second segment section 132 and third segment section 133 extend at different angles relative to axial axis "B". Second side section 99 includes a fourth segment section 135, a fifth segment section 136, and a sixth segment section 138. Fourth segment section 135 extends substantially parallel to axial axis "B" while fifth section 136 and sixth segment section 137 extend at different angles relative to axial axis "B". With this arrangement, the particular shape of first and second pluralities of channels 86 and 88 allows designers to tailor circumferential stiffness and thermal response of leak resistant compliant bushing 64 to specific operating conditions.

Reference will follow to FIG. 8, wherein like reference numbers represent corresponding parts in the respective views, in describing leak resistant compliant bushing 64 in accordance with still yet another non-limiting example. First side portion 95 and second side portion 96 of each of the first plurality of channels 86 extend substantially parallel to one another and to axial axis "B". In a non-limiting example, first side portion 95 and second side portion 96 join at a curvilinear portion 141 defined by terminal end 90. Similarly, first side section 98 and second side section 99 extend substantially parallel to one another and to axial axis "B". In a non-limiting example, first side section 98 and second side section 99 join at a curvilinear portion 142 defined by terminal end section 92. Curvilinear portion 142 can be defined by either a constant or a varied radius.

Figure 10:
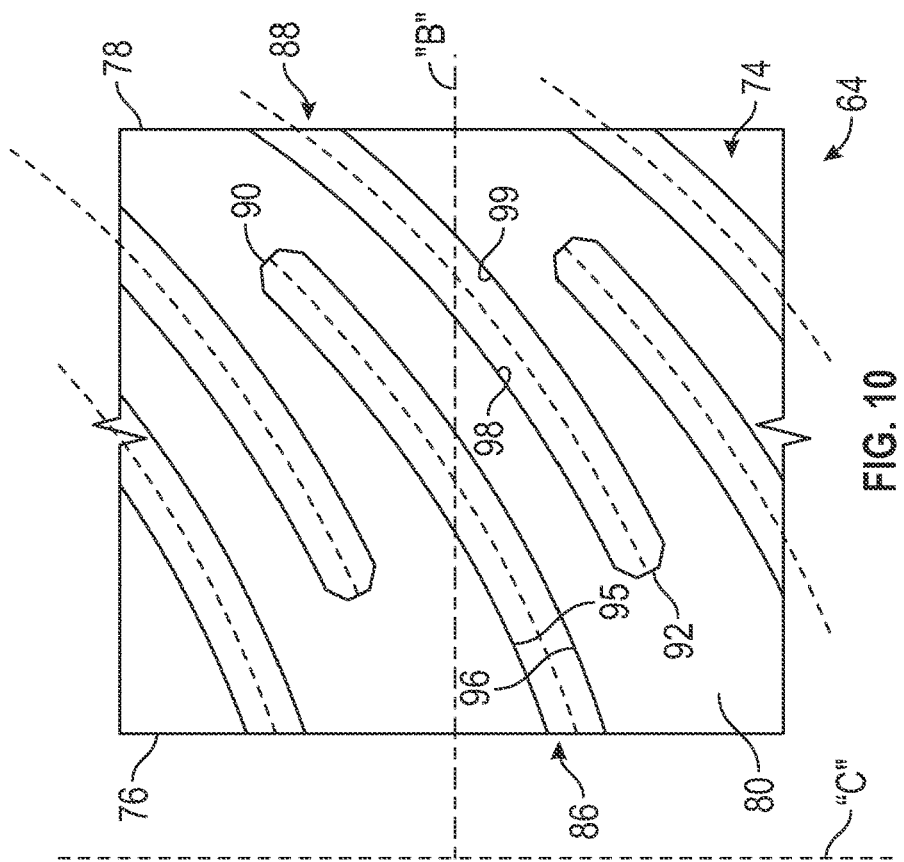
FIG. 10 is a schematic plan view of outer surface of the leak resistant compliant bushing showing details of the first and second pluralities of channels, in accordance with still yet another non-limiting example.
Figure 9:
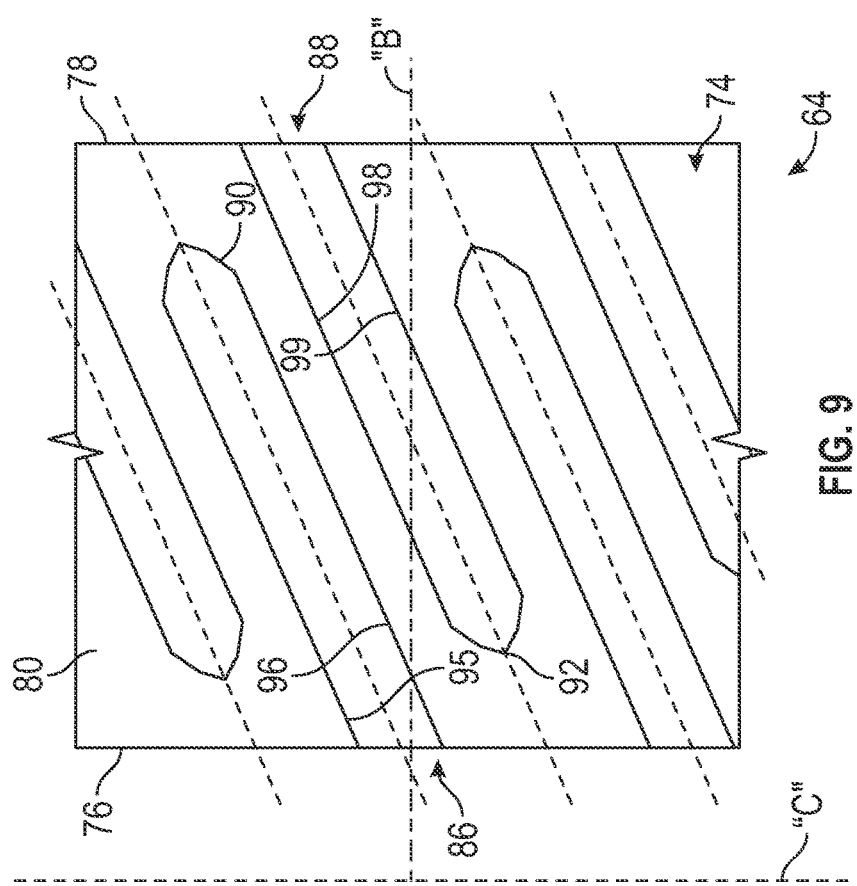
FIG. 9 is a schematic plan view of outer surface of the leak resistant compliant bushing showing details of the first and second pluralities of channels, in accordance with yet still another non-limiting example.

In FIG. 9, first side portion 95 and second side portion 96 of each of the first plurality of channels 86 extend substantially parallel to one another and to at a constant angle relative to axial axis "B". Likewise, first side section 98 and second side section 99 extend substantially parallel to one another and at a constant angle relative to axial axis "B". In FIG. 10 first side portion 95 and second side portion 96 of each of the first plurality of channels 86 extend substantially parallel to one another and to at a varying angle relative to axial axis "B". Likewise, first side section 98 and second side section 99 extend substantially parallel to one another and at a varying angle relative to axial axis "B". The arrangements depicted in FIGS. 8-10 allow first and second pluralities of channels 86 and 88 to be formed with conventional machining processes using, for example, a rotary bit. In accordance with other non-limiting examples, individual ones of the first plurality of channels 86 and/or the second plurality of channels 88 may be sized to possess the same (e.g., uniform sizing and positioning of the channels) or different (e.g., non-uniform sizing and/or positioning of individual channels).

Reference will now follow to FIGS. 11 and 12, wherein like reference numbers represent corresponding parts in the respective views. In accordance with a non-limiting example, first segment 104 is spaced from third segment 107 of each of the first plurality of channels 86 a first width "D1". Second segment 105 is spaced from fourth segment 108 of each of the first plurality of channels 86 a second width "D2" that varies along the axial axis "A". First segment section 110 is spaced from third segment section 112 of each of the second plurality of channels 88 a third width D3". Second segment section 111 is spaced from fourth segment section 113 of each of the second plurality of channels a fourth width "D4". In accordance with a non-limiting example, the first width "D1" and the third width "D3" are substantially uniform (e.g., constant along hoop direction "C" as shown in FIG. 11 and the second width "D2" and fourth width "D4" are non-uniform (e.g., not constant) along the hoop direction "C" as shown in FIG. 12. In other embodiments, other more complex relationships between mutual sizing of variables D1, D2, D3 and D4 can be defined according to structural optimization of bushings, performed for example by the Finite Element Method.

Figure 13A:
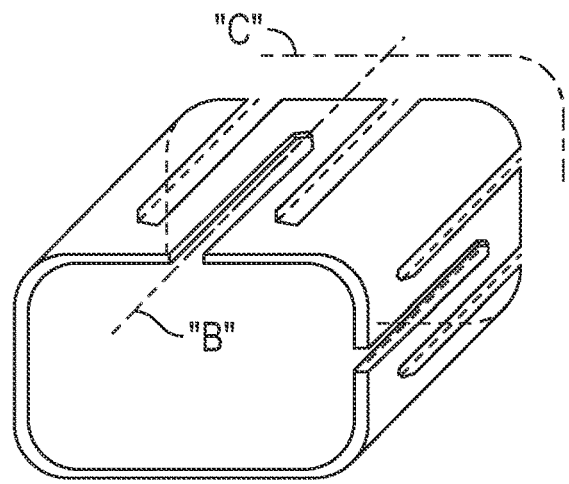
FIG. 13A depicts a perspective view of a leak resistant compliant bushing having a non-circular cross-section, in accordance with a non-limiting example.
Figure 13B:
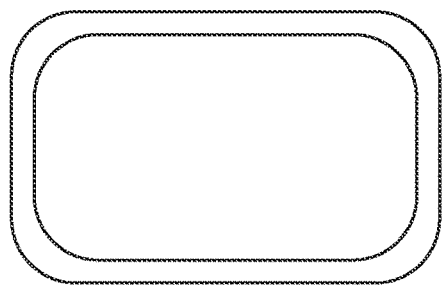
FIG. 13B depicts a cross-sectional view of a leak resistant compliant bushing having a non-circular cross-section, in accordance with another non-limiting example.
Figure 13C:
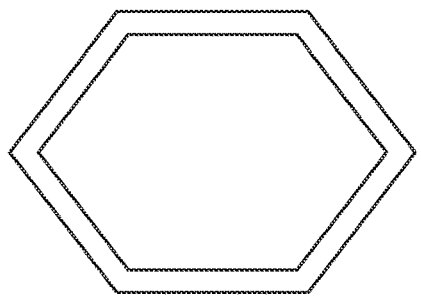
FIG. 13C depicts a cross-sectional view of a leak resistant compliant bushing having a non-circular cross-section, in accordance with yet another non-limiting example.

At this point, it should be understood that the non-limiting examples shown and described herein represent various channel geometries that promote compliance in an annular bushing without introducing a leak path such as would be created by a split. Different channel geometries create varying degrees of compliance that may accommodate a wide range of operating conditions and installation methods. Further, while described as being formed from metal or metal alloy, other materials, particularly thermally responsive materials may also be employed. Additionally, while shown as having a substantially circular cross-section, the leak resistant compliant bushing may take on a wide range of shapes, including circular, as shown in FIGS. 3-4, and non-circular cross-sections, as shown in FIGS. 13A-C, as well as a wide range of sizes. Examples of non-circular cross-sections can include, among others, quadratic, and rectangular shapes (FIG. 13A-B), polygonal shapes with different number of sides, e.g., triangular, pentangular, hexagonal (as illustrated in FIG. 13C) shapes, elliptical shapes, or other multi-segment shapes combining linear and/or curved profiles in different segments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A leak resistant compliant bushing comprising:
    a body having a first end, a second end, an outer surface and an inner surface defining a passage, the outer surface and the inner surface extending between the first end and the second end and defining an axial axis;
    a first plurality of channels extending into the body from the first end, each of the first plurality of channels including a terminal end that is spaced from the second end, each of the first plurality of channels including a first central axis that extends from the first end through the terminal end; and
    a second plurality of channels extending into the body from the second end, each of the second plurality of channels extending between adjacent ones of the first plurality of channels and including a terminal end section that is spaced from the first end, each of the second plurality of channels including a second central axis that extends from the first end through the terminal end, wherein each of the first central axis and the second central axis extends across the body at a non-zero angle relative to the axial axis.

2. The leak resistant compliant bushing according to claim 1, wherein each of the first plurality of channels includes a first side portion and a second side portion that join at the terminal end and each of the second plurality of channels includes a first side section and a second side section that join at the terminal end section.

3. The leak resistant compliant bushing according to claim 2, wherein the terminal end includes a curvilinear portion.

4. The leak resistant compliant bushing according to claim 1, wherein each of the first central axis and the second central axis are curvilinear.

5. An aircraft comprising:
    a fuselage;
    at least one engine supported by the fuselage;
    a mechanical system arranged in the fuselage, the mechanical system including a shaft supported by a leak resistant compliant bushing comprising:
        a body having a first end, a second end, an outer surface and an inner surface defining a passage, the outer surface and the inner surface extending between the first end and the second end and defining an axial axis;
        a first plurality of channels extending into the body from the first end, each of the first plurality of channels including a terminal end that is spaced from the second end each of the first plurality of channels including a first central axis that extends from the first end through the terminal end; and
        a second plurality of channels extending into the body from the second end, each of the second plurality of channels extending between adjacent ones of the first plurality of channels and including a terminal end section that is spaced from the first end, each of the second plurality of channels including a second central axis that extends from the first end through the terminal end, wherein each of the first central axis and the second central axis extends across the body at a non-zero angle relative to the axial axis.

6. The compliant bushing according to claim 5, wherein each of the first plurality of channels includes a first side portion and a second side portion that join at the terminal end and each of the second plurality of channels includes a first side section and a second side section that join at the terminal end section.

7. The compliant bushing according to claim 6, wherein each of the first plurality of channels and the second plurality of channels extends across the body at a non-zero angle relative to the axial axis.

8. The aircraft according to claim 5, wherein each of the first central axis and the second central axis are curvilinear.

9. A leak resistant compliant bushing comprising:
a body having a first end, a second end, an outer surface and an inner surface defining a passage, the outer surface and the inner surface extending between the first end and the second end and defining an axial axis;
a first plurality of channels having a first geometry extending into the body from the first end, each of the first plurality of channels including a terminal end that is spaced from the second end, wherein each of the first plurality of channels includes a first side portion and a second side portion that join at the terminal end; and
a second plurality of channels having a second geometry that is distinct from the first geometry, the second plurality of channels extending into the body from the second end, each of the second plurality of channels extending between adjacent ones of the first plurality of channels and including a terminal end section that is spaced from the first end, wherein each of the second plurality of channels includes a first side section and a second side section that join at the terminal end section.

10. The leak resistant compliant bushing according to claim 9, wherein the first side portion includes a first segment and a second segment, and the second side portion includes a third segment and a fourth segment, wherein the first segment and the third segment extend at a zero angle relative to the axial axis.

11. The leak resistant compliant bushing according to claim 10, wherein the second segment and the fourth segment extend at a non-zero angle relative to the axial axis.

12. The leak resistant compliant bushing according to claim 10, wherein the first side section includes a first segment section and a second segment section, and the second side section includes a third segment section and a fourth segment section.

13. The leak resistant compliant bushing according to claim 12,
wherein the first segment is spaced from the third segment at a first width, and the second segment is spaced from the fourth segment at a second width, and
wherein the first segment section is spaced from the third segment section at a third width and the second segment section is spaced from the fourth segment section at a fourth width.

14. The leak resistant compliant bushing according to claim 13, wherein the second width is non-uniform along the axial axis.

15. The leak resistant compliant bushing according to claim 13, wherein the first width, and the second width of each of the first plurality of channels and the third width and the fourth width of each of the second plurality of channels are substantially constant along a hoop direction of the bushing.

16. The leak resistant compliant bushing according to claim 13, wherein the second width of each of the first plurality of channels and the fourth width of each of the second plurality of channels are non-uniform along the hoop direction.

* * * * *